United States Patent
Shin

(10) Patent No.: US 8,121,459 B2
(45) Date of Patent: Feb. 21, 2012

(54) PREVIEW METHOD

(75) Inventor: Seung Yong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 1285 days.

(21) Appl. No.: 11/808,883

(22) Filed: Jun. 13, 2007

(65) Prior Publication Data

US 2007/0297763 A1 Dec. 27, 2007

(30) Foreign Application Priority Data

Jun. 13, 2006 (KR) .................. 10-2006-0053005

(51) Int. Cl.
*H04N 9/80* (2006.01)
(52) U.S. Cl. .................. 386/241; 386/243; 386/343
(58) Field of Classification Search .................. 386/241, 386/243, 343
See application file for complete search history.

(56) References Cited

U.S. PATENT DOCUMENTS

| | | | | |
|---|---|---|---|---|
| 5,457,669 A | * | 10/1995 | Kim et al. | 369/30.15 |
| 7,450,821 B2 | * | 11/2008 | Shiiyama | 386/343 |
| 2002/0197053 A1 | * | 12/2002 | Nakamura et al. | 386/35 |
| 2005/0286362 A1 | * | 12/2005 | Fujishima | 369/47.1 |

FOREIGN PATENT DOCUMENTS

| | | |
|---|---|---|
| EP | 0 724 211 A2 | 7/1996 |
| JP | 2000-148771 A | 5/2000 |
| KR | 0126791 B1 | 4/1998 |

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

A preview method is discussed. According to an embodiment, the preview method includes calculating preview reproduction periods for respective chapters that are selected for reproduction, based on a set preview period; and reproducing each chapter for the preview reproduction period calculated for the corresponding chapter.

19 Claims, 4 Drawing Sheets

PREVIEW METHOD

This application claims the benefit of Korean Patent Application No. 10-2006-0053005 filed on Jun. 13, 2006 in Republic of Korea, which is hereby incorporated by reference as if fully set forth herein.

BACKGROUND OF THE INVENTION

1. Field of the Invention

The present invention relates generally to a preview method and, more particularly, to a method of summarizing and reproducing content contained in a recording medium or titles recorded on the recording medium.

2. Description of the Related Art

A user of a video device, which is used to reproduce a recording medium, that is, an optical disk such as a Compact Disk (CD) or Digital Versatile Disk (DVD), or a hard disk, can reproduce moving images at high speed through the manipulation of a variable speed reproduction key such as a fast forward key, in order to enable the schematic content of the moving images contained in the recording medium to be grasped.

Furthermore, for a title that is classified into a plurality of chapters, the user can grasp the schematic content of moving images by reproducing a chapter through the manipulation of a key, which is used to select a subsequent chapter, and then selecting a subsequent chapter by manipulating again the key Furthermore, in the case where such a video device provides an intermittent reproduction mode, that is, a method of reproducing portions of respective chapters while searching for the start locations of the respective chapters, the user can grasp the schematic content of a recording medium or titles recorded on the recording medium using the intermittent reproduction mode.

However, in the case where reproduction is performed at high speed through the manipulation of the fast forward key, it is inconvenient to have to manipulate the key every time, and it also takes a lot of time to entirely reproduce a title. Furthermore, when it is required to manipulate the key to select a subsequent chapter or to use the intermittent reproduction mode, problems occur in that it is not easy to grasp the schematic content of a title in the case where a small number of chapters are included in the title, and in that it takes a lot of time to reproduce all of the chapters in the case where a large number of chapters are included in the title.

SUMMARY OF THE INVENTION

Accordingly, the present invention has been made keeping in mind the above problems and limitations associated with the related art, and an object of the present invention is to provide a preview method, which enables a user to grasp the schematic content of a recording medium or titles recorded on the recording medium.

Another object of the present invention is to provide a preview method, which address the limitations and problems associated with the related art.

In order to accomplish the above and other objects, the present invention provides according to an embodiment a preview method, including the steps of calculating preview reproduction periods, which are assigned to respective chapters that are selected for summarization and reproduction, based on a set preview period; and summarizing and reproducing each chapter for the preview reproduction period calculated for a corresponding chapter.

In one embodiment of the present invention, when summarization and reproduction for one or more titles is requested and a value, which is obtained by dividing the number of chapters included in the titles by the preview period, is smaller than a predetermined value, chapters may be selected from among the chapters included in the titles such that a value obtained by dividing a number of the selected chapters by the preview period is equal to or greater than the predetermined value. In this case, a number of chapters that is proportional to a reproduction period of each title or to the number of chapters included in each title may be selected from a corresponding title.

In one embodiment of the present invention, when summarization and reproduction for one or more titles is requested and a value, which is obtained by dividing the number of chapters included in the titles by the preview period, is smaller than a predetermined value, chapters having an even or odd number may be selected from among the chapters included in the titles.

In one embodiment of the present invention, a preview reproduction period, which corresponds to a value obtained by dividing a number of the selected chapters by the preview period, may be assigned to each of the chapters, or preview reproduction period that is proportional to the respective reproduction periods of the selected chapters may be assigned to the respective chapters.

In one embodiment of the present invention, a beginning portion of a chapter may be summarized and reproduced for the reproduction periods for the chapter, or reproduction speed for a chapter may be adjusted such that the chapter is summarized and reproduced for the reproduction period calculated for the chapter. Furthermore, the beginning portion of a chapter may be summarized and reproduced for the reproduction period calculated for the chapter when the calculated reproduction period is shorter than a predetermined period, whereas reproduction speed for a chapter may be adjusted such that summarization and reproduction is performed for the reproduction period calculated for the respective chapters when the calculated reproduction period is not shorter than the predetermined period. Furthermore, the reproduction period for a chapter is longer than a predetermined period, summarization and reproduction may be performed for the calculated reproduction period while movement to regularly spaced locations or arbitrary locations in the chapter is made. When the reproduction period calculated for a chapter is longer than a predetermined period, summarization and reproduction may be performed for the calculated reproduction period while movement to locations, which correspond to beginning, middle and end portions of the chapter, is made. In this case, movement to a subsequent location is made after reproduction from a location to which movement is made is performed for a period equal to or longer than a predetermined period.

In one embodiment of the present invention, the summarization and reproduction may be stopped and reproduction may be performed at a location or a chapter in which the summarization and reproduction is currently being performed when a reproduction command is input. In this case, the summarization and reproduction may be performed again at a stop location or a location at which the reproduction is currently being performed when a return command is input while the reproduction is performed in response to the reproduction command.

According to another aspect, the present invention provides a preview method comprising: receiving, from a user, an input of a preview period and at least one title selected among a plurality of titles; calculating a preview reproduction period for each of at least one chapter associated with the input title, based on the input preview period; and reproducing each of the at least one chapter for the corresponding calculated preview reproduction period.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Preferred embodiments of the present invention are described in detail with reference to the accompanying drawings below.

In the present invention, the titles of respective moving images, which are contained in a recording medium such as a disk, or one or more target titles, which are selected by a user, are summarized and reproduced based on a preview period, which is input by a user, in an auto preview mode. In more detail, reproduction methods, such as the adjustment of reproduction speed or skip reproduction, are adjusted according to the number of titles, the number of chapters included in each title, the reproduction periods of respective title and/or respective chapters, and the set preview period. Accordingly, the user can effectively grasp the schematic content of the recording medium or the selected titles.

A preview method according to the preferred embodiments of the present invention may be applied to various types of digital video devices, which can include, but are not limited to, DVD players or other recording medium players, or DVD recorders or other recording medium recorders.

Figure 1:
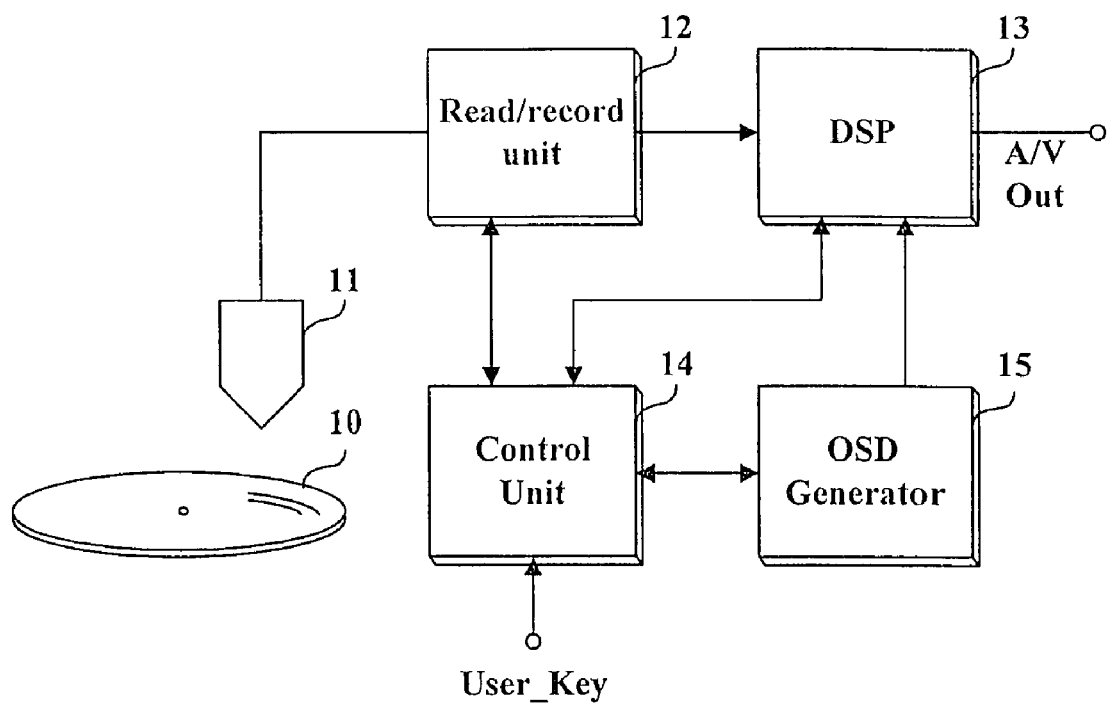
FIG. 1 is a diagram showing the construction of a digital video device to which the present invention is applied.

As shown in FIG. 1, a video device, for example, a DVD player, to which the present invention is applied, may include an optical pickup 11, a recording/reproducing unit 12, a digital signal processing unit 13, a control unit 14, and an On Screen Display (OSD) generation unit 15. The video device may further include other known components. For instance, the video device may include a display unit (e.g., LCD panel, screen, etc.) and/or an audio output unit (e.g., speaker), or may be coupled to a display device and/or an audio output device. All the components of the video device are operatively coupled and configured.

The optical pickup 11 reads data recorded on a recording medium such as an optical disk 10 and/or records data on the optical disk 10. Examples of the optical disk 10 may include, but are not limited to, a CD, DVD, a HD-DVD, etc. The recording/reproducing unit 12 converts a Radio Frequency (RF) signal, which is read from the optical pickup 11, into a binary signal. The digital signal processing unit 13 processes the binary signal to thereby divide the binary signal into digital audio and video signals and perform restoration on the digital audio and video signals. The OSD generation unit 15 generates various menu screens. The control unit 14 controls the operation of the individual components, thus causing data recorded on the optical disk 10 to be reproduced or causing data to be recorded on the optical disk 10.

Figure 2:
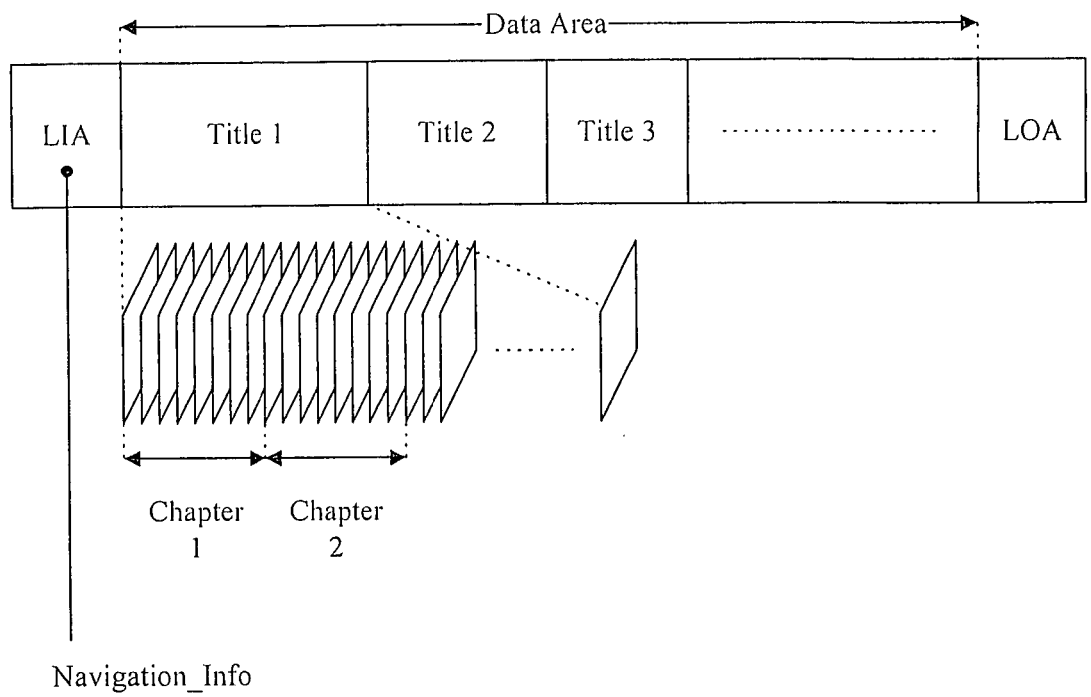
FIG. 2 is a diagram showing an embodiment in which a plurality of titles and a plurality of chapters are recorded on an optical disk.
Figure 2:
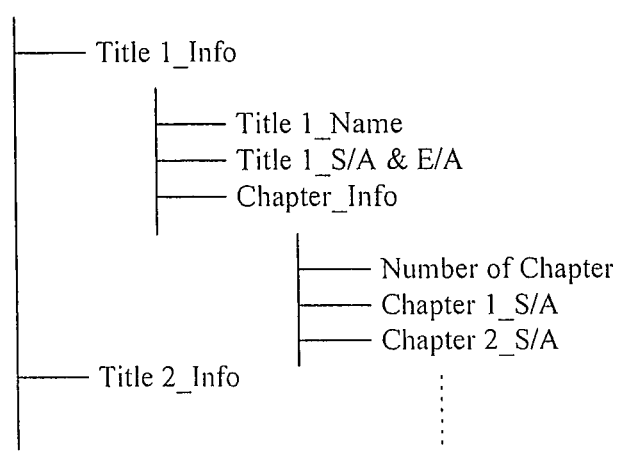

Preferably, the optical disk 10, such as a DVD, is assigned a lead-in area, a data area and a lead-out area, as shown in FIG. 2. Moving image data may be recorded in the data area in the form of one or more titles, and each of the titles may include one or more chapters.

Navigation information, which is management information for controlling the reproduction of titles recorded in the data area, is preferably included in the lead-in area and/or the lead-out area. For example, a title name "Title 1_Name," a title start address/end address "SA/EA," and chapter information "Chapter_Info" may be included in first title information "Title 1_Info," and the number of chapters "Number of Chapters" and the start addresses "S/A" of the respective chapters may be included in the chapter information ("Chapter_Info"). Furthermore, the reproduction periods of a corresponding title and a corresponding chapter may be further included in each piece of title information and each piece of chapter information in the navigation information, respectively.

When the optical disk 10 is inserted into the video device or when the power of the video device is turned on, the control unit 14 reads the navigation information from the optical disk 10 and temporarily stores the read navigation information therein. Thereafter, the control unit 14 performs a reproducing or recording operation on the optical disk 10, with reference to the navigation information, in response to a reproduction or recording request from a user. For example, when the user selects arbitrary titles included in the optical disk 10, the control unit 14 searches for start locations, corresponding to the number of the selected titles, based on the navigation information, causes the optical pickup 11 to move to the corresponding locations, and starts the reproducing operation for reproducing data recorded in the corresponding locations of the optical disk 10.

Figure 3:
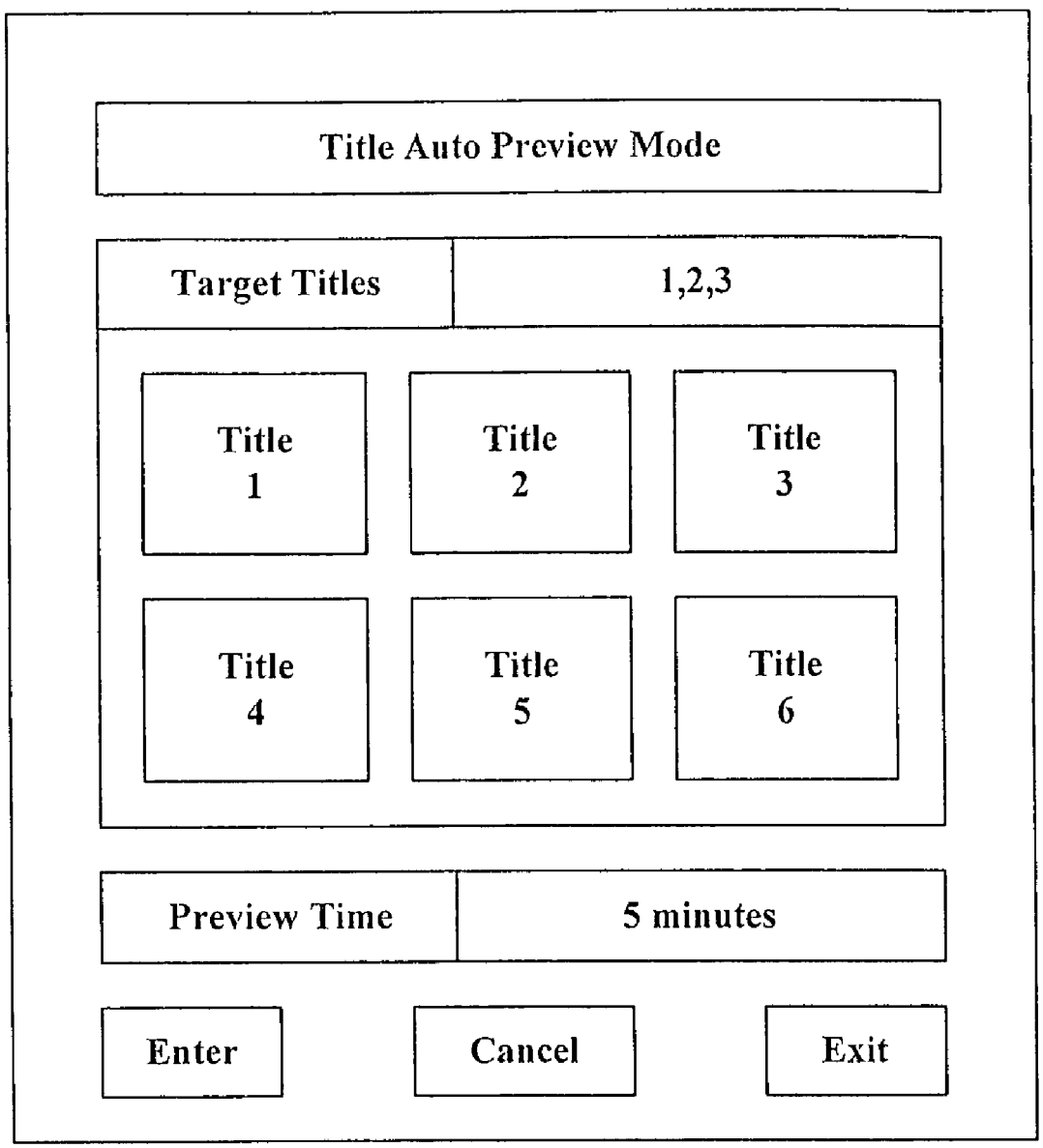
FIG. 3 is a diagram showing an example of a menu screen displayed according to a preview method according to the present invention.

When the auto preview mode is set in response to a request from the user, the control unit 14 causes a menu screen, which can function as a user interface, to be displayed by controlling the OSD generation unit 15. The menu screen can be displayed on a display unit provided in the video device or connected to the video device. As shown in the example of FIG. 3, a list of thumbnail pictures ('Title 1', 'Title 2', 'Title 3', etc.), which correspond to titles recorded on the optical disk 10, is displayed on the menu screen.

Furthermore, when the user selects one or more thumbnail pictures, the control unit 14 designates titles, corresponding to the selected thumbnail pictures, as target titles, which are desired by the user. Thereafter, when a preview period, which is desired by the user, is input through the menu screen, e.g., by the user, the control unit 14 determines reproduction methods, such as the adjustment of reproduction periods, which will be assigned to the respective target titles and/or respective chapters, the adjustment of reproduction speed and skip reproduction based on the set preview period, and performs the reproducing operation on the target titles according to the determined reproduction method.

For example, when a preview period of 5 minutes is input by the user and the total number of chapters included in the selected target titles (1, 2, 3) is 20, the control unit 14 calculates preview reproduction periods that are assigned to the respective chapters. In this example, the control unit 14 obtains 15 seconds, which will be assigned to each of the chapters, by dividing the preview period (5 minutes) by the total number of chapters (20). Thus the control unit 14 controls the recording/reproducing unit 12, so that the beginning portion of each chapter is reproduced for 15 seconds or may perform control the reproduction speed so that each of the chapters is reproduced for 15 seconds.

Furthermore, the control unit 14 compares the calculated preview reproduction period for the respective chapters with a reference period (for example, 10 seconds). When the calculated preview reproduction period is shorter than the reference period, only the beginning portion of each chapter may be reproduced for the calculated preview reproduction period. That is, each chapter may be reproduced from the beginning, only for the calculated preview reproduction period. In contrast, when the calculated preview reproduction period is not shorter than the reference period, reproduction may be performed for the calculated period while jumps to regularly spaced locations or arbitrary locations in each chapter are performed, or reproduction speed may be adjusted such that each of the chapters is reproduced only for the calculated period.

Furthermore, when calculating the reproduction period, which will be assigned to each of the chapters, the control unit 14 may distribute the preview reproduction period in proportion to the reproduction periods of respective chapters with reference to the reproduction periods of the respective chapters included in the navigation information in the lead-in/lead-out area.

For example, assume a preview period of 3 minutes (180 seconds) is input (e.g., by the user), the total number of chapters included in selected target titles is 3, and the respective reproduction periods of the three chapters as stored in the navigation information are respectively 10 minutes, 15 minutes and 20 minutes. Then, the control unit 14 performs calculations, wherein 40 ($=10*180/(10+15+20)$) seconds is assigned to the first chapter among the three chapters, 60 ($=15*180/(10+15+20)$) seconds is assigned to the second chapter among the three chapters, and 80 ($=20*180/(10+15+20)$) seconds is assigned to the third chapter among the three chapters.

Figure 4:
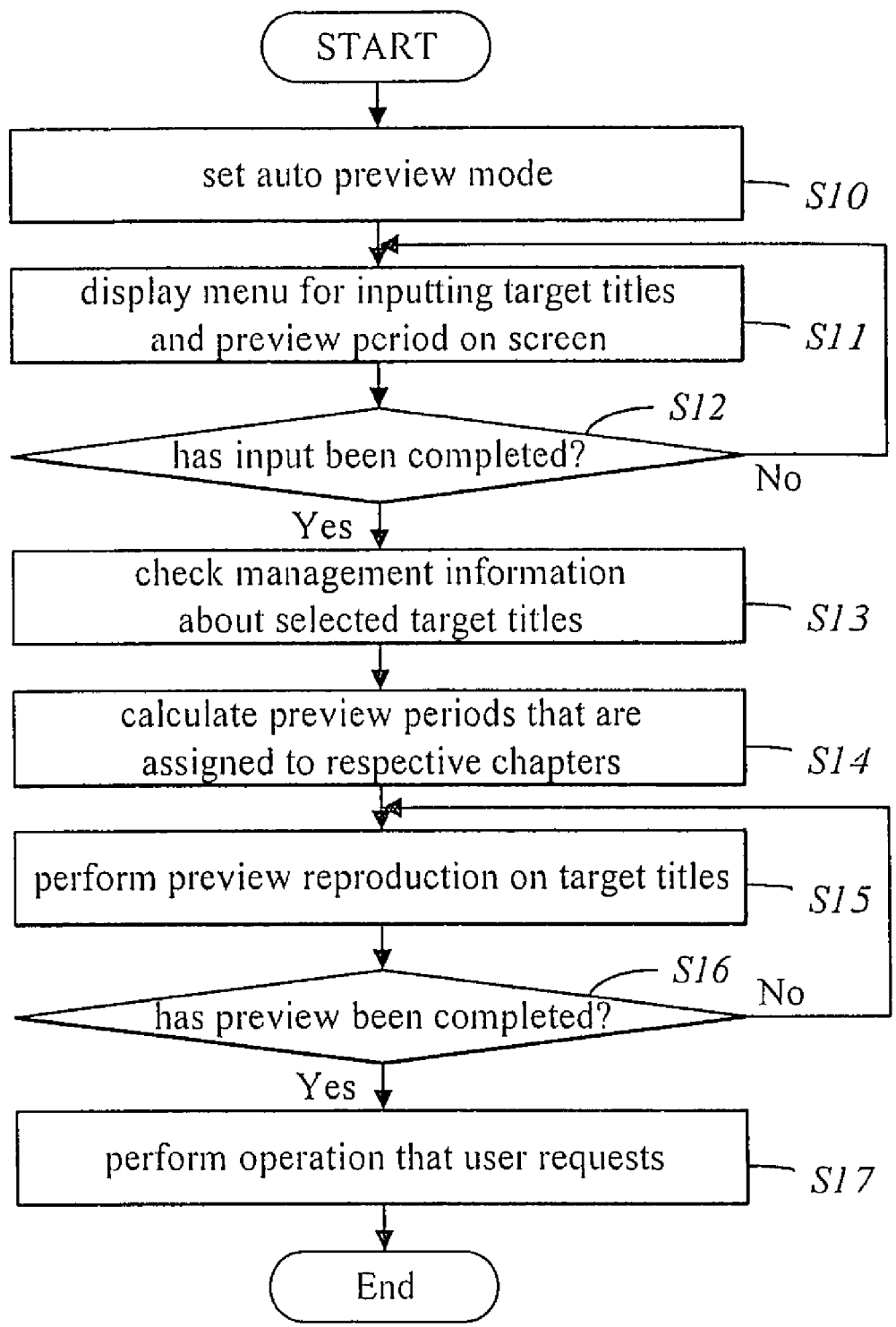
FIG. 4 is a flowchart illustrating a preview method according to an embodiment of the present invention.

FIG. 4 is a flowchart illustrating the preview method according to an embodiment of the present invention. This method is implemented in the video device of FIG. 1 but can be implemented in other suitable recording/reproducing device.

Referring to FIG. 4, when a user manipulates a specific key (for example, an auto preview button) provided in a remote control for remotely controlling the video device (e.g., a DVD player), the control unit 14 sets the operational mode of the DVD player to an auto preview mode at step S10.

Furthermore, the control unit 14 causes the menu screen, which can function as a user interface, to be displayed as described above with reference to FIG. 3 by controlling the OSD generation unit 15, and receives the user's input of target titles and a preview period, at step S11. In this case, menu items that enable the input of the user's desired target titles and preview period by the user, can be included in the menu screen.

For example, as shown in FIG. 3, when the user selects the first to third titles "Titles 1 to 3" from among the first to sixth titles "Titles 1 to 6" recorded on an optical disk 10 such as a DVD, inputs a preview period of 5 minutes and presses an enter key, then the control unit 14 determines that the input of the target titles and the preview period has been completed at step S12. Thereafter, the control unit 14 sets the three selected titles (Titles 1-3) as the target titles and checks management information about the selected titles, at step S13.

In the case where the user does not separately select the desired target titles through the menu screen, all of the titles contained in the optical disk 10 may be set as the user's target titles. Furthermore, a menu screen may be provided in a state in which, for example, 5 minutes or other set time value, is input as a default preview period. Accordingly, when the user presses the enter key in a state in which a preview period is not separately input, the default preview period may be automatically set as the preview period desired by the user.

In step S13, the control unit 14 searches the navigation information of the optical disk 10 for chapter information "Chapter_Info," contained in each of the first to third title information "Title 1_Info~Title 3_Info" corresponding to the target titles 1-3, as described above with reference to FIG. 2. Thereafter, the total number of chapters included in the target titles and/or the reproduction periods of the respective chapters of the target titles are obtained from the found chapter information, and preview reproduction periods, which will be assigned to the respective chapters, are calculated according to the preview period (for example, 5 minutes), at step S14.

For example, when 15 chapters for the first to third titles are searched for, 20 seconds, which is obtained by dividing a preview period of 300 seconds by 15, which is the total number of chapters, may be assigned to the preview reproduction of each of the chapters.

As another example, when a total of 7 chapters are included in the target titles and the respective reproduction periods of these chapters as stored in the navigation information are 3 minutes, 5 minutes, 4 minutes, 6 minutes, 4 minutes, 5 minutes and 3 minutes, respectively, then according to the present invention 30 ($=3*300/(3+5+4+6+4+5+3)$) seconds, 50 ($=5*300/(3+5+4+6+4+5+3)$) seconds, 40 ($=4*300/(3+5+4+6+4+5+3)$) seconds, 60 ($=6*300/(3+5+4+6+4+5+3)$) seconds, 40 seconds, 50 seconds, and 30 seconds are assigned respectively as the preview reproduction periods of the respective chapters.

As a further or another example, in the case where an excessive number of chapters, for example, 100 chapters, is included in the target titles, only 3 seconds may be assigned to each of the chapters, and thus the schematic content of the chapters cannot be easily grasped. According to the present invention, only 60 chapters are randomly selected and reproduced for preview, because this number allows a predetermined sufficient preview reproduction period, in this example, a period equal to or greater than 5 seconds, to be assigned to each of the chapters. In this case, the chapters may be randomly selected in proportion to the number of chapters included in each title or the reproduction period of each title. Furthermore, only chapters having an even or odd number may be selected as chapters for preview reproduction, and preview reproduction periods, which will be assigned to the respective selected chapters, may be calculated again.

Then the control unit 14 reproduces each targeted chapter for the respective calculated preview reproduction period and then jumps to a subsequent chapter, and repeats the reproducing operation, at step S15. Only the beginning portions of the respective chapters may be reproduced for the respective calculated periods for the chapters, or reproduction speed may be adjusted such that the chapters are reproduced for the respective calculated periods for the chapters.

Furthermore, the control unit 14 can compare the calculated preview reproduction periods for the respective chapter with a predetermined reference period, for example, 10 seconds. When the calculated preview reproduction periods are shorter than the reference period, only the beginning portions of the respective chapters may be reproduced for the respective calculated period. In contrast, when the calculated periods are not shorter than the reference period, the chapters may be reproduced for the respective calculated periods by adjusting the reproduction speed.

In the latter case, that is, in the case where the calculated preview reproduction periods are longer than the reference period, the control unit 14 may reproduce the chapters for the respective calculated review reproduction period while movement to regularly spaced locations (e.g., three locations—beginning portion, middle portion, and end portion) or arbitrary locations in each chapter is made. In this case, reproduction of the targeted chapter(s) is performed for a predetermined period, for example, a period equal to or greater than 2 seconds, at the location to which movement is performed and then movement to a subsequent location in the targeted chapter(s) is made. The reason for this is because it is difficult for the user to sufficiently perceive the schematic content of each targeted chapter if reproduction thereof is performed for too short a period at a given location to which movement is performed and then movement to a subsequent location is made.

According to an embodiment, when the user manipulates a reproduction button while preview reproduction is performed on the target titles, the control unit 14 stops the preview reproducing operation for a while and starts a reproducing operation from a location or a chapter at which the preview is currently being performed. When the user manipulates a return button while the reproduction is performed, the preview reproducing operation is performed again at the location at which the preview reproduction operation was stopped or at the location at which the reproduction is currently being performed.

Thereafter, when the above-described preview operation is stopped or completed at step S16, the control unit 14 performs an operation that the user requests at step S17.

A method of assigning preview reproduction periods to respective chapters and performing the preview reproduction of the chapters based on the assigned periods has been described above, but a method of assigning periods to respective titles and performing the preview scanning of the titles on the basis of the assigned periods in the same manner as described above may be used in the case where chapters are not defined in each title, that is, in the case where each title is formed of only one chapter, or in the case where a very high number of target titles is selected for preview.

Furthermore, different names may be used for the titles and the chapters. That is, in order to classify moving image programs recorded on a recording medium, the term 'title' has been used as an example of a main unit, and the term 'chapter' has been used as an example of a sub unit, which belongs to a class lower than the main unit. However, the present invention is not limited to the terms 'title' and 'chapter,' and different terms having the same functions as those of the titles and the chapters or similar functions thereto may be employed.

Accordingly, a user can effectively grasp the schematic content of a recording medium or titles recorded in the recording medium, and a desired portion of data recorded on the recording medium can be easily accessed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A preview method comprising:
    calculating preview reproduction periods for respective chapters that are selected for reproduction, based on a set preview period; and
    reproducing each chapter for a preview reproduction period among the preview reproduction periods calculated for the corresponding chapter,
    wherein when summarization and reproduction for one or more titles are requested and a value, which is obtained by dividing the set preview period by a number of chapters included in the requested titles, is smaller than a predetermined value, chapters having an even or odd number are selected from among the chapters included in the requested titles.

2. The preview method as set forth in claim 1, wherein, when the summarization and reproduction for one or more titles is requested and the value, which is obtained by dividing the set preview period by the number of chapters included in the requested titles, is smaller than the predetermined value, the chapters having the even or odd number are selected from among the chapters included in the requested titles such that a value obtained by dividing the set preview period by a number of the selected chapters is equal to or greater than the predetermined value.

3. The preview method as set forth in claim 2, wherein a number of chapters that is proportional to a reproduction period of each title or to a number of chapters included in each title is selected from the corresponding title.

4. The preview method as set forth in claim 1, wherein the preview reproduction period, which corresponds to a value obtained by dividing the set preview period by a number of the selected chapters, is assigned to each of the chapters.

5. The preview method as set forth in claim 1, wherein the preview reproduction periods that are proportional to respective prestored reproduction periods of the selected chapters are assigned to the respective chapters.

6. The preview method as set forth in claim 1, wherein a beginning portion of a chapter is summarized and reproduced for the preview reproduction period calculated for the corresponding chapter.

7. The preview method as set forth in claim 1, wherein a reproduction speed for each chapter is adjusted such that the corresponding chapter is summarized and reproduced for the preview reproduction period calculated for the corresponding chapter.

8. The preview method as set forth in claim 1, wherein a beginning portion of a chapter is summarized and reproduced for the preview reproduction period calculated for the corresponding chapter when the calculated preview reproduction period is shorter than a predetermined period, whereas a reproduction speed for the chapter is adjusted such that the summarization and reproduction are performed for the preview reproduction period calculated for the corresponding chapter when the calculated preview reproduction period is not shorter than the predetermined period.

9. The preview method as set forth in claim 1, wherein, when the preview reproduction period calculated for a chapter is longer than a predetermined period, the summarization and reproduction of the corresponding chapter are performed for the calculated preview reproduction period while a movement to regularly spaced locations or arbitrary locations in the corresponding chapter is made.

10. The preview method as set forth in claim 1, wherein, when the preview reproduction period calculated for a chapter is longer than a predeteimined period, the summarization and reproduction of the corresponding chapter are performed for the calculated preview reproduction period while a movement to locations, which correspond to beginning, middle and end portions of the corresponding chapter, is made.

11. The preview method as set forth in claim 9, wherein a movement to a subsequent location is made after reproduction from a location to which the movement is made, is performed for a period equal to or longer than a predetermined period.

12. The preview method as set forth in claim 1, wherein the reproducing step comprises stopping the summarization and reproduction, and performing a reproduction at a location or a chapter in which the summarization and reproduction are currently being performed when a reproduction command is input.

13. The preview method as set forth in claim 12, wherein the reproducing step comprises performing the summarization and reproduction again at a stop location or a location at which the reproduction is currently being performed when a return command is input while the reproduction is performed in response to the reproduction command.

14. The preview method as set forth in claim 1, wherein the chapters selected for the reproducing step are chapters that are either included in overall titles contained in a recording medium or in one or more titles selected by a user.

15. The preview method as set forth in claim 1, wherein in the calculating step, the preview period is either a previously set value or a value input by a user.

16. A preview method comprising:
receiving, from a user, an input of a preview period and at least one title selected among a plurality of titles;
calculating a preview reproduction period for each of at least one chapter associated with the input title, based on the input preview period; and
reproducing each of the at least one chapter for the corresponding calculated preview reproduction period,
wherein when summarization and reproduction for the at least one title are requested and a value, which is obtained by dividing the input preview period by a number of at least one chapter associated with the input title, is smaller than a predetermined value, chapters having an even or odd number are selected from among the chapters included in the at least one title.

17. The method of claim 16, wherein the calculating step includes:
dividing the input preview period by the number of the at least one chapter associated with the input title; and
assigning an output value of the dividing step to be the calculated preview reproduction period for each of the at least one chapter associated with the input title.

18. The method of claim 16, wherein the calculating step includes:
obtaining a prestored reproduction period for each of the at least one chapter associated with the input title; and
obtaining a total period value by summing all prestored reproduction periods of all of the at least one chapter associated with the input title.

19. The method of claim 18, wherein the calculating step further includes:
for each of the at least one chapter associated with the input title, multiplying the input preview period by a ratio of the corresponding prestored reproduction period and the total period value, and assigning an output value of the multiplication to be the corresponding calculated preview reproduction period.

* * * * *